US008976882B2

(12) United States Patent
Taoka et al.

(10) Patent No.: US 8,976,882 B2
(45) Date of Patent: Mar. 10, 2015

(54) PRECODING WEIGHT GENERATION METHOD AND CONTROL APPARATUS

(75) Inventors: Hidekazu Taoka, Tokyo (JP); Kenichi Higuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 225 days.

(21) Appl. No.: 13/579,444

(22) PCT Filed: Feb. 9, 2011

(86) PCT No.: PCT/JP2011/052700
§ 371 (c)(1),
(2), (4) Date: Oct. 23, 2012

(87) PCT Pub. No.: WO2011/105213
PCT Pub. Date: Sep. 1, 2011

(65) Prior Publication Data
US 2013/0034187 A1 Feb. 7, 2013

(30) Foreign Application Priority Data

Feb. 24, 2010 (JP) ................. 2010-038248

(51) Int. Cl.
| H04B 7/06 | (2006.01) |
| H04B 7/02 | (2006.01) |
| H04B 7/04 | (2006.01) |
| H04W 72/06 | (2009.01) |
| H03C 7/02 | (2006.01) |

(52) U.S. Cl.
CPC .............. *H04B 7/0626* (2013.01); *H04B 7/024* (2013.01); *H04B 7/0452* (2013.01); *H04B 7/0697* (2013.01)
USPC ........... 375/267; 375/260; 375/259; 375/296; 375/295; 370/352; 370/241; 370/328; 370/310; 455/525; 455/524; 455/517; 455/507; 455/39; 455/63.4; 455/63.1

(58) Field of Classification Search
CPC .... H04B 7/0639; H04B 7/0626; H04B 7/024; H04B 7/0478; H04B 7/0491; H04B 7/0617; H04B 7/0663; H04L 5/0035; H04L 5/0073; H04L 1/0026; H04L 1/0029; H04W 72/04; H04W 72/1226; H04W 72/085; H04W 72/0426
USPC .......... 375/267, 260, 259, 296, 295; 370/352, 370/241, 328, 310; 455/525, 524, 517, 507, 455/500, 39, 63.4, 63.1
See application file for complete search history.

(56) References Cited

U.S. PATENT DOCUMENTS

| 5,227,875 A * | 7/1993 | Suu et al. ................. 375/240.25 |
| 2010/0039951 A1* | 2/2010 | She et al. ....................... 370/252 |
| 2012/0115497 A1* | 5/2012 | Tolli et al. .................... 455/452.2 |

OTHER PUBLICATIONS

Office Action for corresponding Japanese Application No. 2010-038248, mailed Oct. 8, 2013 (4 pages).

(Continued)

*Primary Examiner* — Chieh M Fan
*Assistant Examiner* — Michelle M Koeth
(74) *Attorney, Agent, or Firm* — Osha Liang LLP

(57) ABSTRACT

A precoding weight generation method involves generating a channel matrix having channel state information transmitted as feedback from mobile stations undergoing spatial multiplexing for each cell that base stations manage, and generating precoding weights. When data transmission is targeted for a first mobile station that transmits the channel state information as feedback as well as transmits the channel state information to a weight generation target cell that is a target for generation of precoding weights, precoding weights are generated so as not to suppress interference on a second mobile station that transmits the channel state information as feedback as well as transmits the channel state information to the weight generation target cell, while suppressing interference on a third mobile station that does not transmit the channel state information as feedback except to the weight generation target cell.

6 Claims, 5 Drawing Sheets

(56) References Cited

OTHER PUBLICATIONS

International Search Report w/translation from PCT/JP2011/052700 mailed Mar. 22, 2011 (2 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

\* cited by examiner

US 8,976,882 B2

PRECODING WEIGHT GENERATION METHOD AND CONTROL APPARATUS

TECHNICAL FIELD

The present invention relates to a precoding weight generation method and control apparatus, and more particularly, to a precoding weight generation method and control apparatus for supporting multi-antenna transmission.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz.

In the LTE-scheme system (LTE system), MIMO (Multi Input Multi Output) systems are proposed as radio communication techniques for transmitting and receiving data using a plurality of antennas and improving a data rate (spectral efficiency) (for example, see Non-patent Document 1). In the MIMO systems, the transmitter/receiver is provided with a plurality of transmission/reception antennas, and the transmitter (for example, base station apparatus eNB) simultaneously transmits different transmission information sequences from different transmission antennas. Meanwhile, the receiver (for example, mobile station apparatus UE) side exploits the fact that different fading variations occur between transmission and reception antennas, and divides the simultaneously-transmitted information sequences to detect, and it is thereby possible to increase the data rate (spectral efficiency). In addition, in the LTE system are specified Single User MIMO (SU-MIMO) transmission in which transmission information sequences simultaneously transmitted from different transmission antennas are all for the same user and Multiple User MIMO (MU-MIMO) transmission in which the transmission information sequences are for different users.

Further, in the LTE-A-scheme system (LTE-A system), transmission and reception of data channel signals by Coordinated Multiple Point (CoMP) is studied, for the purpose of reducing inter-cell interference or improving the reception signal intensity. By performing transmission and reception by the CoMP, particularly, it is expected to improve system characteristics in a mobile station apparatus UE positioned at the cell edge. Base station apparatuses eNBs of a plurality of cells generate precoding weights of data channel signals for each mobile station apparatus UE, based on a measurement value of CSI (Channel State Information) transmitted from each mobile station apparatus UE as feedback. As a transmission method by CoMP, for example, Joint Transmission (JT) is proposed in which base station apparatuses eNBs of a plurality of cells join data channel signals (PDSCH: Physical Downlink Shared Channel) to the same mobile station apparatus UE to transmit.

PRIOR ART DOCUMENT

Non-patent Document

[Non-patent Document 1] 3GPP TR 25.913 "Requirements for Evolved UTRA and Evolved UTRAN"

DISCLOSURE OF INVENTION

Technical Problem

In the above-mentioned Joint Transmission, when a base station apparatus eNB that generates precoding weights is capable of grasping the CSI from all mobile station apparatuses UEs for all coordinated base station apparatuses eNBs with accuracy, it is possible to maximally improve system characteristics for all mobile station apparatuses UEs including a mobile station apparatus UE positioned at the cell edge. However, events may occur that the CSI is not transmitted from all mobile station apparatuses as feedback due to reductions in the feedback information amount in the mobile station apparatus UE and the like.

Particularly, when MU-MIMO transmission is performed in an environment where Joint Transmission is performed, it is expected that interference increases among a plurality of mobile station apparatuses UEs to perform spatial multiplexing. Therefore, when precoding weights are generated for the plurality of mobile station apparatuses UEs, it is necessary to effectively reduce interference among the mobile station apparatuses UEs.

The present invention was made in view of such circumstances, and it is an object of the invention to provide a precoding weight generation method and control apparatus for enabling interference among mobile station apparatuses to be reduced as possible even when the CSI is not transmitted from all mobile station apparatuses as feedback in an environment where Joint Transmission is performed for a plurality of mobile station apparatuses.

Solution to the Problem

A precoding weight generation method of the invention is a precoding weight generation method used for a plurality of base station apparatuses in coordinating and transmitting data to a plurality of mobile station apparatuses by Joint Transmission, and is characterized by having the steps of generating a channel matrix having, in matrix elements, channel state information transmitted as feedback from a plurality of mobile station apparatuses undergoing spatial multiplexing for each cell that each of the base station apparatuses manages, and generating precoding weights based on the channel matrix successively starting from a cell having the highest number of mobile station apparatuses that transmit the channel state information as feedback, where when data transmission is targeted for a first mobile station apparatus that transmits the channel state information as feedback as well as a weight generation target cell that is a target for generation of precoding weights, precoding weights are generated so as not to suppress interference on a second mobile station apparatus that transmits the channel state information as feedback as well as the weight generation target cell, while suppressing interference on a third mobile station apparatus that does not transmit the channel state information as feedback except the weight generation target cell.

According to this method, since precoding weights are generated to suppress interference on the third mobile station apparatus that does not transmit the channel state information as feedback except the weight generation target cell, it is possible to preferentially suppress interference on the third mobile station apparatus such that suppression of interference is not expected in a cell except the weight generation target cell, it is possible to effectively improve system characteristics in the third mobile station apparatus with the low number of cells to transmit the channel state information as feedback, and it is possible to minimize interference among mobile station apparatuses even when the CSI is not transmitted from all mobile station apparatuses as feedback in an environment where Joint Transmission is performed for a plurality of mobile station apparatuses.

Particularly, since interference is preferentially suppressed on the third mobile station apparatus that does not transmit the channel state information as feedback except the weight generation target cell, for the second mobile station apparatus that transmits the channel state information as feedback as well as the weight generation target cell, it is possible to efficiently use in interference suppression in consideration of versatility of antennas in the base station apparatus, and it is thereby possible to suppress interference among mobile station apparatuses irrespective of the number of coordinated cells.

A precoding weight generation method of the invention is a precoding weight generation method used for a plurality of base station apparatuses in coordinating and transmitting data to a plurality of mobile station apparatuses by Joint Transmission, and is characterized by having the steps of generating a channel matrix including, in matrix elements, channel state information transmitted as feedback from a plurality of mobile station apparatuses undergoing spatial multiplexing in a cell managed by each base station apparatus and each cell, while having a zero element in a matrix element associated with channel state information between a mobile station apparatus that does not perform feedback and the base station apparatus, and collectively generating precoding weights for all mobile station apparatuses based on the channel matrix.

According to this method, precoding weights are generated based on a channel matrix including, in matrix elements, channel state information transmitted as feedback from a plurality of mobile station apparatuses, while having a zero element in a matrix element associated with channel state information between a mobile station apparatus that does not perform feedback and the base station apparatus, it is thereby possible to generate precoding weights including the mobile station apparatus that does not transmit the channel state information as feedback, it is possible to effectively suppress interference on mobile station apparatuses that transmit the channel state information as feedback, and therefore, it is possible to minimize interference among mobile station apparatuses even when the CSI is not transmitted from all mobile station apparatuses as feedback in an environment where Joint Transmission is performed for a plurality of mobile station apparatuses.

Particularly, since a plurality of base station apparatuses is capable of forming transmission beams enabling interference to be suppressed for a mobile station apparatus that transmits the channel state information as feedback to a plurality of cells, it is possible to more suppress interference among mobile station apparatuses for a mobile station apparatus having the higher number of coordinated cells (the number of cells to which the channel state information is transmitted as feedback).

Advantageous Effect of the Invention

According to the invention, since precoding weights are generated to suppress interference on a mobile station apparatus that does not transmit the channel state information as feedback except the weight generation target cell, it is possible to preferentially suppress interference on the mobile station apparatus such that suppression of interference is not expected in a cell except the weight generation target cell, it is possible to effectively improve system characteristics in the mobile station apparatus with the low number of cells to transmit the channel state information as feedback, and it is possible to minimize interference among mobile station apparatuses even when the CSI is not transmitted from all mobile station apparatuses as feedback in an environment where Joint Transmission is performed for a plurality of mobile station apparatuses.

BEST MODE FOR CARRYING OUT THE INVENTION

Figure 1:
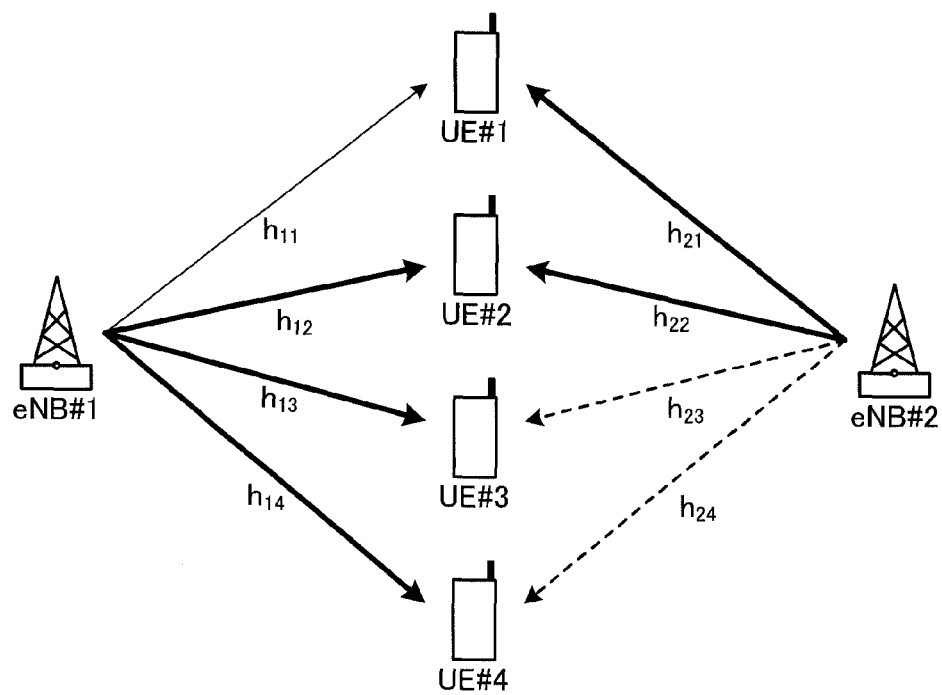
FIG. 1 is a network configuration diagram to explain an outline of Joint Transmission that is one of CoMP.

Prior to explanation of a precoding weight generation method according to the invention, described is an outline of Joint Transmission that is one of Coordinated Multiple Point (COMP). FIG. 1 is a network configuration diagram to explain the outline of Joint Transmission that is one of CoMP. In addition, FIG. 1 shows the Joint Transmission case where base station apparatuses eNB#1 and eNB#2 coordinate, combine data channel signals (PDSCH) to same mobile station apparatuses UE#1 to UE#4 to transmit.

"$h_{11}$" shown in FIG. 1 represents channel state information (hereafter, referred to as "CSI (Channel State Information)") of a propagation path channel from one of the base station apparatuses eNB#1 to the mobile station apparatus UE#1, and "$h_{21}$" represents CSI of a propagation path channel from the other base station apparatus eNB#2 to the mobile station apparatus UE#1. The mobile station apparatuses UE#1 to UE#4 measure the CSI of propagation path channels to transmit to the base station apparatuses eNB#1 and eNB#2 as feedback.

The CSI transmitted to the base station apparatuses eNB#1 and eNB#2 as feedback is collected in the base station apparatus eNB#1 (hereinafter, referred to as a "control base station eNB" as appropriate) that generates precoding weights required for Joint Transmission. Then, the control base station apparatus eNB generates precoding weights of data channel signals respectively to mobile station apparatuses UE#1 to UE#4 from base station apparatuses eNB#1 and eNB#2. The base station apparatuses eNB#1 and eNB#2 perform precoding on data channel signals respectively to mobile station apparatuses UE#1 to UE#4 using the precoding weights, and it is thereby expected to improve system characteristics in the mobile station apparatuses UE#1 to UE#4. In other words, to improve system characteristic in the mobile station apparatuses UE#1 to UE#4, it is the premise that the control base station apparatus eNB grasps the CSI from the mobile station apparatuses UE#1 to UE#4 to the base station apparatuses eNB#1 and eNB#2 with accuracy.

Meanwhile, for the purpose of reducing the feedback information amount and the like, in the mobile station apparatus UE, it is general to transmit the CSI as feedback only when a ratio between reception power of a signal transmitted from some base station apparatus eNB and reception power in a base station apparatus providing maximum reception power exceeds a predetermined threshold. Accordingly, events may occur that the CSI is not transmitted as feedback when a mobile station apparatus UE is located at a far distance from the base station apparatus eNB, and the reception power ratio of the signal from the base station apparatus eNB is a predetermined threshold or less, and the like. FIG. 1 shows the case where reception power of signals from the base station apparatus eNB#2 are a predetermined threshold or less in the mobile station apparatuses UE#3 and UE#4 and the CSI is not transmitted as feedback. In other words, FIG. 1 shows the case where the mobile station apparatuses UE#1 and UE#2 transmit the CSI to the base station apparatuses eNB#1 and eNB#2 as feedback, and the mobile station apparatuses UE#3 and UE#4 transmit the CSI only to the base station apparatus eNB#1 as feedback.

Thus, when the CSI is not transmitted as feedback from a part of mobile station apparatuses (mobile station apparatuses UE#3 and UE#4 shown in FIG. 1) targeted for communications, the control base station apparatus eNB is not able to generate suitable precoding weights, and it is difficult to maximally improve system characteristics in the mobile apparatuses UE#1 to UE#4. The inventors of the invention noted the respect that the CSI is not always transmitted from all mobile station apparatuses UEs although it is the premise to accurately grasp the CSI from all mobile station apparatuses UEs for all coordinated base station apparatuses eNBs in Joint Transmission, and arrived at the invention.

In addition, in the above-mentioned description, the case is described where one of base station apparatuses, eNB#1, generates precoding weights required for Joint Transmission, but the configuration for generating precoding weights is not limited thereto. For example, the other base station apparatus eNB#2 may perform generation, or a higher station apparatus connected to the base station apparatus eNB#1 and eNB#2 may perform generation. It is possible to refer to the base station apparatus eNB or higher station apparatus which thus generates precoding weights required for Joint Transmission as a control apparatus.

In a precoding weight generation method according to a first aspect of the invention, the control apparatus generates a channel matrix $H_K$ ("K" represents the number of a cell) having, in matrix elements, CSI of a plurality of mobile station apparatuses UEs to perform spatial multiplexing for each coordinated cell (base station apparatus eNB), and based on the channel matrix $H_K$, generates precoding weights successively starting from a cell having the highest number of mobile station apparatuses that transmit the CSI as feedback. In this case, precoding weights are generated so as to preferentially suppress interference on mobile station apparatuses UEs that do not transmit the CSI as feedback except the cell (hereafter, referred to as a "weight generation target cell" as appropriate) that is a target for generation of precoding weights, while not suppressing interference on mobile station apparatuses UEs that transmit the CSI as feedback as well as the weight generation target cell.

The case will be described below where the precoding weight generation method according to the first aspect is applied, in an environment in which Joint Transmission is performed between a "cell #1" with the high number of mobile station apparatuses UEs that transmit the CSI as feedback, and a "cell #2" with the low number of mobile station apparatuses UEs that transmit the CSI as feedback.

In generating precoding weights in the cell #1, precoding weights are generated so as to preferentially suppress interference on a mobile station apparatus UE-$N_{K=1}$ that does not transmit the CSI as feedback except the cell #1, while not suppressing interference on the other mobile station apparatuses UEs. Then, in generating precoding weights in the cell #2, the mobile station apparatus UE-$N_{K=1}$ on which interference is already suppressed is excepted, and precoding weights are generated so as to preferentially suppress interference on a mobile station apparatus UE-$N_{K=2}$ that does not transmit the CSI as feedback except the cells #1 and #2, while not suppressing interference on the other mobile station apparatuses UEs. In addition, the precoding weight for the mobile station apparatus UE-$N_{K=2}$ that is generated in the cell #1 is referred to, in the case of generating a precoding weight for the mobile station apparatus UE-$N_{K=2}$.

In addition, described here in is the method of generating precoding weights in the cells #1 and #2, and also in the case where three or more coordinated cells exist, precoding weights are generated in a similar manner. In this case, the mobile station apparatuses UEs (mobile station apparatus UE-$N_{K=1}$ and mobile station apparatus UE-$N_{K=2}$) on which interference is already suppressed are excepted, and precoding weights are generated so as to preferentially suppress interference on a mobile station apparatus UE (mobile station apparatus UE-$N_{K=3}$) that does not transmit the CSI as feedback except the cells #1 to #3, while not suppressing interference on the other mobile station apparatuses UEs. In addition, the precoding weight for the mobile station apparatus UE-$N_{K=3}$ that is generated in the cell #1 is referred to, in the case of generating a precoding weight for the mobile station apparatus UE-$N_{K=3}$.

Herein, the precoding weight generation method according to the first aspect will be described using the specific example as shown in FIG. 1. In the example as shown in FIG. 1, since mobile station apparatuses UE#1 to UE#4 transmit the CSI to the base station apparatus eNB#1 as feedback, and mobile station apparatuses UE#1 and UE#2 transmit the CSI to the base station apparatus eNB#2 as feedback, the cell in which the base station apparatus eNB#1 is installed corresponds to the cell #1, and the cell in which the base station apparatus eNB#2 is installed corresponds to the cell #2.

In generating precoding weights in the cell #1, precoding weights are generated so as to preferentially suppress interference on the mobile station apparatuses UE#3 and UE#4 (that correspond to the mobile station apparatus UE-$N_{K=1}$) that do not transmit the CSI as feedback except the cell #1, while not suppressing interference on the other mobile station apparatuses, UE#1 and UE#2. Then, in generating precoding weights in the cell #2, the mobile station apparatuses UE#3 and UE#4 on which interference is already suppressed are excepted, and precoding weights are generated so as to preferentially suppress interference on the mobile station apparatuses UE#1 and UE#2 (that correspond to the mobile station apparatus UE-$N_{K=2}$) that do not transmit the CSI as feedback except the cells #1 and #2, while not suppressing interference on the other mobile station apparatuses UEs (that do not exist in FIG. 1). In addition, precoding weights for the mobile station apparatuses UE#1 and UE#2 that are generated in the cell #1 are referred to, in the case of generating precoding weights for the mobile station apparatus apparatuses UE#1 and UE#2 in the cell #2.

Next, an example of generation equations of precoding weights will be described in the precoding weight generation method according to the first aspect. Herein, for convenience in description, it is assumed that the generation equations of precoding weights according to the first aspect are described using the specific example as shown in FIG. 1. In addition, shown herein are generation equations using a ZF (Zero Forcing) precoding method, but the invention is not limited thereto. For example, it is possible to use generation equations using an MMSE (Minimum Mean Squared Error) method or block diagonalization method.

In generating precoding weights in the cell #1, generated first is a channel matrix $H_{eNB1}$ expressed by (Eq. 1) comprised of the CSI of all mobile station apparatuses UE1 to UE#4 undergoing spatial multiplexing in the cell #1. Then, based on the channel matrix $H_{eNB1}$, precoding weights for the mobile station apparatuses UE#1 to UE#4 are generated individually.

$$H_{eNB1} = \begin{pmatrix} h_{11} \\ h_{12} \\ h_{13} \\ h_{14} \end{pmatrix} \quad \text{(Eq. 1)}$$

A precoding weight $w_{eNB1,UE1}$ for the mobile station apparatus UE#1 is calculated by (Eq. 3) using a channel matrix $H'_{eNB1}$ expressed by (Eq. 2) that is a partial matrix of the channel matrix $H_{eNB1}$. Herein, the channel matrix $H'_{eNB1}$ is comprised of the CSI ($h_{11}, h_{13}, h_{14}$) of the mobile station apparatuses UE#1, UE#3 and UE#4 without the mobile station apparatus #UE2. In other words, the channel matrix $H'_{eNB1}$ forms a channel matrix with the matrix element associated with the mobile station apparatus UE#2 deleted.

$$H'_{eNB1} = \begin{pmatrix} h_{11} \\ h_{13} \\ h_{14} \end{pmatrix} \quad \text{(Eq. 2)}$$

$$(w_{eNB1,UE1} w'_{eNB1,UE3} w'_{eNB1,UE4}) = H'^H_{eNB1} (H'_{eNB1} H'^H_{eNB1})^{-1} \quad \text{(Eq. 3)}$$

Herein, the reason why CSI $h_{12}$ of the mobile station apparatus UE#2 is eliminated from the channel matrix $H'_{eNB1}$ is to preferentially form null-directed transmission beams for the mobile station apparatuses UE#3 and UE#4, while removing the mobile station apparatus UE#2 from targets for generation of null-directed transmission beam. In other words, the channel matrix $H'_{eNB1}$ including the CSI means that it is possible to form suitable transmission beams for the corresponding mobile station apparatuses UEs by referring to the CSI. More specifically, it is possible to form a transmission beam having the directivity for a target terminal for data transmission, while forming a null-directed transmission beam for a non-target terminal for data transmission. In the precoding weight generation method according to the first aspect, the mobile station apparatus UE#2, which transmits the CSI as feedback as well as the weight generation target cell, is removed from targets for generation of null-directed transmission beam, and flexibility of antenna selection is thereby ensured in the base station apparatus eNB.

In addition, in above-mentioned (Eq. 3), precoding weights $w'_{eNB1,UE3}$ and $w'_{eNB1,UE4}$ for the mobile station apparatuses UE#3 and UE#4 are also generated, but the values are not used. As precoding weights $w_{eNB1,UE3}$ and $w_{eNB1,UE4}$ for the mobile station apparatuses UE#3 and UE#4, used are values generated according to (Eq. 6) described later.

Similarly, a precoding weight $w_{eNB1,UE2}$ for the mobile station apparatus UE#2 is calculated by (Eq. 5) using a channel matrix $H''_{eNB1}$ expressed by (Eq. 4) that is a partial matrix of the channel matrix $H_{eNB1}$. Herein, the channel matrix $H''_{eNB1}$ is comprised of the CSI ($h_{12}, h_{13}, h_{14}$) of the mobile station apparatuses UE#2, UE#3 and UE#4 without the mobile station apparatus #UE1.

$$H''_{eNB1} = \begin{pmatrix} h_{12} \\ h_{13} \\ h_{14} \end{pmatrix} \quad \text{(Eq. 4)}$$

$$(w_{eNB1,UE2} w''_{eNB1,UE3} w''_{eNB1,UE4}) = H''^H_{eNB1} (H''_{eNB1} H''^H_{eNB1})^{-1} \quad \text{(Eq. 5)}$$

In addition, in above-mentioned (Eq. 5), precoding weights $w''_{eNB1,UE3}$ and $w''_{eNB1,UE4}$ for the mobile station apparatuses UE#3 and UE#4 are also generated, but as in above-mentioned (Eq. 3), the values are not used. As precoding weights $w_{eNB1,UE3}$ and $w_{eNB1,UE4}$ for the mobile station apparatuses UE#3 and UE#4, used are values generated according to (Eq. 6) described later.

The precoding weights $w_{eNB1,UE3}$ and $w_{eNB1,UE4}$ for the mobile station apparatuses UE#3 and UE#4 are calculated by (Eq. 6) using the channel matrix $H_{eNB1}$.

$$(w'_{eNB1,UE1} w'_{eNB1,UE2} w_{eNB1,UE3} w_{eNB1,UE4}) = H^H_{eNB1} (H_{eNB1} H^H_{eNB1})^{-1} \quad \text{(Eq. 6)}$$

In this case, as distinct from above-mentioned (Eq. 1) and (Eq. 3), the reason why the CSI (($h_{11}, h_{12}, h_{13}, h_{14}$) of all the mobile station apparatuses UE#1 to UE#4 is included is to form null-directed transmission beams for all the mobile station apparatuses UE#1 to UE#4 except the mobile station apparatus UE targeted for data transmission.

In addition, in above-mentioned (Eq. 6), precoding weights $w'_{eNB1,UE1}$ and $w'_{eNB1,UE2}$ for the mobile station apparatuses UE#1 and UE#2 are also generated, but the values are not used. As precoding weights $w_{eNB1,UE1}$ and $w_{eNB1,UE2}$ for the mobile station apparatuses UE#1 and UE#2, used are the values generated respectively according to (Eq. 3) and (Eq. 5).

After thus generating the precoding weights in the cell #1, precoding weights in the cell #2 are generated. In generating the precoding weights in the cell #2, generated first is a channel matrix $H_{eNB2}$ expressed by (Eq. 7) comprised of the CSI of all mobile station apparatuses UE1 and UE#2 undergoing spatial multiplexing in the cell #2. Then, based on the channel matrix $H_{eNB2}$, precoding weights for the mobile station apparatuses UE#1 and UE#2 are generated individually.

$$H_{eNB2} = \begin{pmatrix} h_{21} \\ h_{22} \end{pmatrix}$$ (Eq. 7)

In generating a precoding weight $w_{eNB2,UE1}$ for the mobile station apparatus UE#1, precoding weights are generated to form a null-directed transmission beam for the mobile station apparatus UE#2. The reason why a null-directed transmission beam is generated for the mobile station apparatus UE#2 is that as a result of removing the mobile station apparatus UE#2 from targets for generation of null-directed transmission beam in the cell #1, interference among other mobile station apparatuses UEs is not reduced on the mobile station apparatus UE#2. In this case, considered are the precoding weight $w_{eNB1,UE1}$ generated in the cell #1 and the CSI $h_{12}$, $h_{22}$ of the mobile station apparatus UE#2. Herein, an interference amount that the transmission beam pattern of the mobile station apparatus UE#1 gives to the mobile station apparatus UE#2 is calculated by (Eq. 8). In consideration of such an interference amount, the precoding weight $w_{eNB2,UE1}$ for the mobile station apparatus UE#1 is calculated by (Eq. 9). By this means, it is possible to decrease the effect of interference by the precoding weight for the mobile station apparatus UE#2 generated previously in the cell #1.

$$h_{12}w_{eNB1,UE1} + h_{22}w_{eNB2,UE1} = 0$$ (Eq. 8)

$$w_{eNB2,UE1} = h_{22}^{-}h_{12}w_{eNB1,UE1}$$ (Eq. 9)

Similarly, in generating a precoding weight $w_{eNB2,UE2}$ for the mobile station apparatus UE#2, precoding weights are generated to form a null-directed transmission beam for the mobile station apparatus UE#1. In this case, considered are the precoding weight $w_{eNB1,UE2}$ generated in the cell #1 and the CSI $h_{11}$, $h_{21}$ of the mobile station apparatus UE#1. Herein, an interference amount that the transmission beam pattern of the mobile station apparatus UE#2 gives to the mobile station apparatus UE#1 is calculated by (Eq. 10). In consideration of such an interference amount, the precoding weight $w_{eNB2,UE2}$ for the mobile station apparatus UE#2 is calculated by (Eq. 11). By this means, it is possible to decrease the effect of interference by the precoding weight for the mobile station apparatus UE#1 generated previously in the cell #1.

$$h_{11}w_{eNB1,UE2} + h_{21}w_{eNB2,UE2} = 0$$ (Eq. 10)

$$w_{eNB2,UE2} = h_{21}^{-}h_{12}w_{eNB1,UE2}$$ (Eq. 11)

Further, in the cell #2, since the CSI $h_{23}$, $h_{24}$ of the mobile station apparatuses UE#3 and UE#4 is not transmitted as feedback, precoding weights $w_{eNB2,UE3}$ and $w_{eNB2,UE4}$ for the mobile station apparatuses UE#3 and UE#4 are set at "0". In other words, the base station apparatus eNB2 does not transmit any signals to the mobile station apparatuses UE#3 and UE#4. In addition, when the base station apparatus eNB2 transmits data to the mobile station apparatuses UE#1 and UE#2, transmission beams without null being directed are formed for the mobile station apparatuses UE#3 and UE#4, and mobile station apparatuses UE#3 and UE#4 receive the effect of interference among the mobile station apparatuses.

Figure 2:
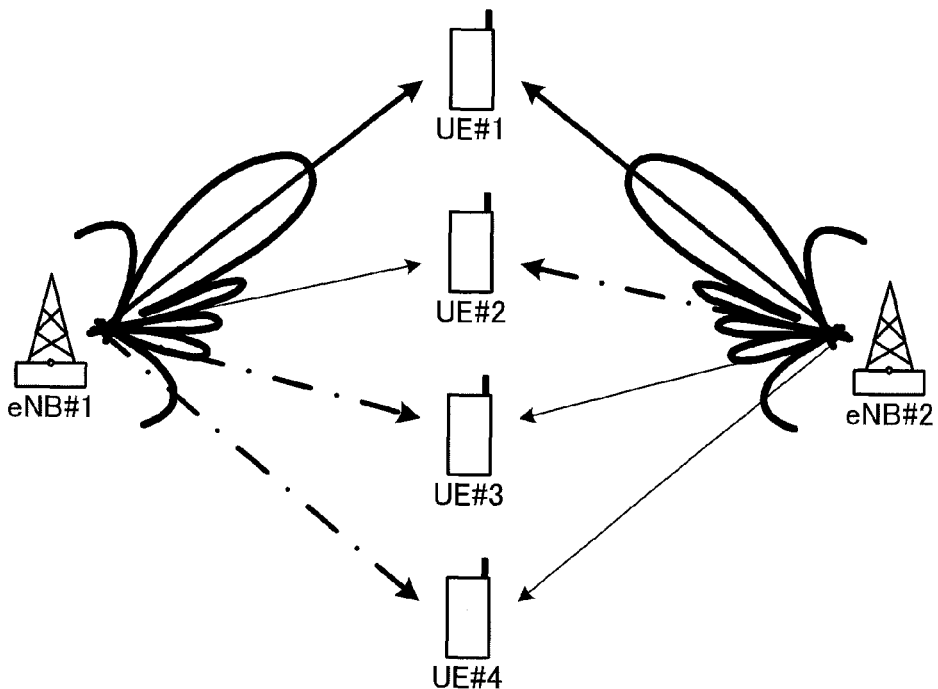
FIG. 2 is a diagram to explain states of transmission beams in transmitting data to a mobile station apparatus UE#1 using precoding weights generated in a precoding weight generation method according to a first aspect of the invention.

FIG. 2 is a diagram to explain states of transmission beams in transmitting data to the mobile station apparatus UE#1 using precoding weights generated in the precoding weight generation method according to the first aspect. In FIG. 2, states of transmission beams for the mobile station apparatuses UEs from the base station apparatuses eNBs are shown by arrows of bold solid lines, thin solid lines, and alternate long and short dashed lines. The bold solid lines represent transmission beams having the directivity, the thin solid lines represent transmission beams without null being directed, and the alternate long and short dashed lines represent null-directed transmission beams.

As shown in FIG. 2, the base station apparatus eNB#1 forms a transmission beam having the directivity for the mobile station apparatus UE#1 that is a target for data transmission. Further, the apparatus eNB#1 forms null-directed transmission beams for the mobile station apparatuses UE#3 and UE#4 (that correspond to the mobile station apparatus UE-$K_{N=1}$) that do not transmit the CSI except the cell #1, and interference among other mobile station apparatuses UEs is suppressed. Meanwhile, the transmission beam without null being directed is formed for the mobile station apparatus UE#2, and interference among other mobile station apparatuses UEs is not suppressed.

Meanwhile, the base station apparatus eNB#2 forms a transmission beam having the directivity for the mobile station apparatus UE#1 that is a target for data transmission. A null-directed transmission beam is formed for the mobile station apparatus UE#2 for which interference is not suppressed in the base station apparatus eNB#1, and interference is suppressed. Meanwhile, the transmission beams without null being directed are formed for the mobile station apparatuses UE#3 and UE#4, and interference is not suppressed. In these cases, the mobile station apparatus UE#1 constitutes the first mobile station apparatus in claim 1, the mobile station apparatus UE#2 constitutes the second mobile station apparatus, and the mobile station apparatuses UE#3 and UE#4 constitute the third mobile station apparatus.

Figure 3:
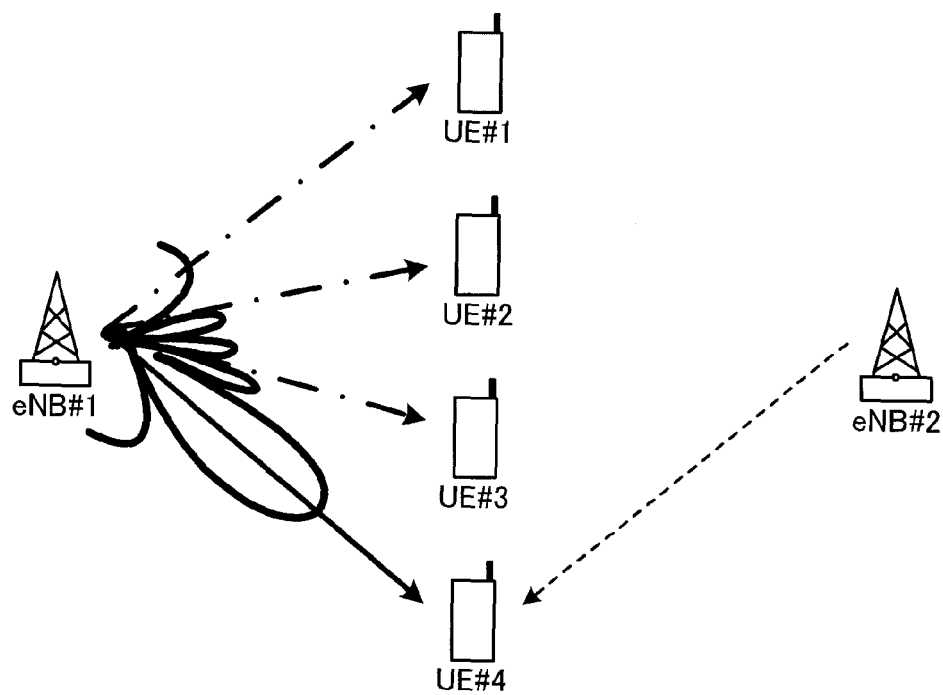
FIG. 3 is a diagram to explain states of transmission beams in transmitting data to a mobile station apparatus UE#4 using precoding weights generated in the precoding weight generation method according to the first aspect of the invention.

FIG. 3 is a diagram to explain states of transmission beams in transmitting data to the mobile station apparatus UE#4 using precoding weights generated in the precoding weight generation method according to the first aspect. As shown in FIG. 3, the base station apparatus eNB#1 forms a transmission beam having the directivity for the mobile station apparatus UE#4 that is a target for data transmission. Further, the apparatus eNB#1 forms null-directed transmission beams for the mobile station apparatuses UE#1 to UE#3, and interference among other mobile station apparatuses UEs is suppressed. Meanwhile, the base station apparatus eNB#2 does not transmit any data to the mobile station apparatus UE#4 that is the target for data transmission (shown by the dotted arrow in FIG. 3).

Thus, in the precoding weight generation method according to the first aspect, a channel matrix $H_K$ comprised of the CSI of a plurality of mobile station apparatuses UEs to perform spatial multiplexing is generated for each coordinated cell, and based on the channel matrix $H_K$, precoding weights are generated successively starting from the cell with the highest number of mobile station apparatuses UEs that transmit the CSI as feedback. In this case, the precoding weights are generated so as to preferentially suppress interference on mobile station apparatuses UEs that do not transmit the CSI as feedback except the weight generation target cell, while not suppressing interference on the other mobile station apparatuses UEs. By this means, it is possible to preferentially suppress interference on the mobile station apparatuses UEs such that suppression of interference is not expected in a cell except the weight generation target cell, it is possible to effectively improve system characteristics in the mobile station apparatuses UEs with the low number of cells to transmit the CSI as feedback, and it is possible to minimize interference among mobile station apparatuses UEs even when the CSI is not transmitted from all mobile station apparatuses UEs as feedback in an environment where Joint Transmission is performed for a plurality of mobile station apparatuses UEs.

Particularly, in the precoding weight generation method according to the first aspect, it is possible to efficiently use in interference suppression in consideration of versatility of antennas in the base station apparatus eNB, and it is thereby possible to suppress interference among mobile station apparatuses UEs irrespective of the number of coordinated cells.

In a precoding weight generation method according to a second aspect of the invention, the control apparatus generates a channel matrix H including, in matrix elements, the CSI of a plurality of mobile station apparatuses UEs to perform spatial multiplexing by a plurality of coordinated cells (base station apparatuses eNBs) and MU-MIMO, while having a zero element in a matrix element associated with the CSI between a mobile station apparatus UE that does not perform feedback and the base station apparatus eNB, and based on the channel matrix H, collectively generates precoding weights from all base station apparatuses eNBs for all mobile station apparatuses UEs.

Shown herein is an example of generation equations of precoding weights in the precoding weight generation method according to the second aspect. Herein, for convenience in description, it is assumed that the generation equations of precoding weights according to the second aspect are described using the specific example as shown in FIG. 1. In addition, shown herein are generation equations using a ZF (Zero Forcing) precoding method, but the invention is not limited thereto. For example, it is possible to use generation equations using an MMSE (Minimum Mean Squared Error) method or block diagonalization method.

In generating precoding weights by the precoding weight generation method according to the second aspect, generated first is a channel matrix H expressed by (Eq. 12) comprised of the CSI of all mobile station apparatuses UE#1 to UE#4 undergoing spatial multiplexing in all cells #1 and #2. In this case, a value of "0" is inserted in matrix elements associated with the CSI between the mobile station apparatuses UE#3 and UE#4 that does not transmit the CSI and the base station apparatus eNB#2.

$$H = \begin{pmatrix} h_{11} & h_{21} \\ h_{12} & h_{22} \\ h_{13} & 0 \\ h_{14} & 0 \end{pmatrix} \quad \text{(Eq. 12)}$$

Then, using the channel matrix H, precoding weights from the base station apparatuses eNB#1 and eNB#2 for all mobile station apparatuses UE#1 to UE#4 are generated by (Eq. 13).

$$W = \begin{pmatrix} W_{eNB1,UE1} & W_{eNB1,UE2} & W_{eNB1,UE3} & W_{eNB1,UE4} \\ W_{eNB2,UE1} & W_{eNB1,UE2} & 0 & 0 \end{pmatrix} \quad \text{(Eq. 13)}$$

$$= H^H(HH^H)^{-1}$$

Figure 4:
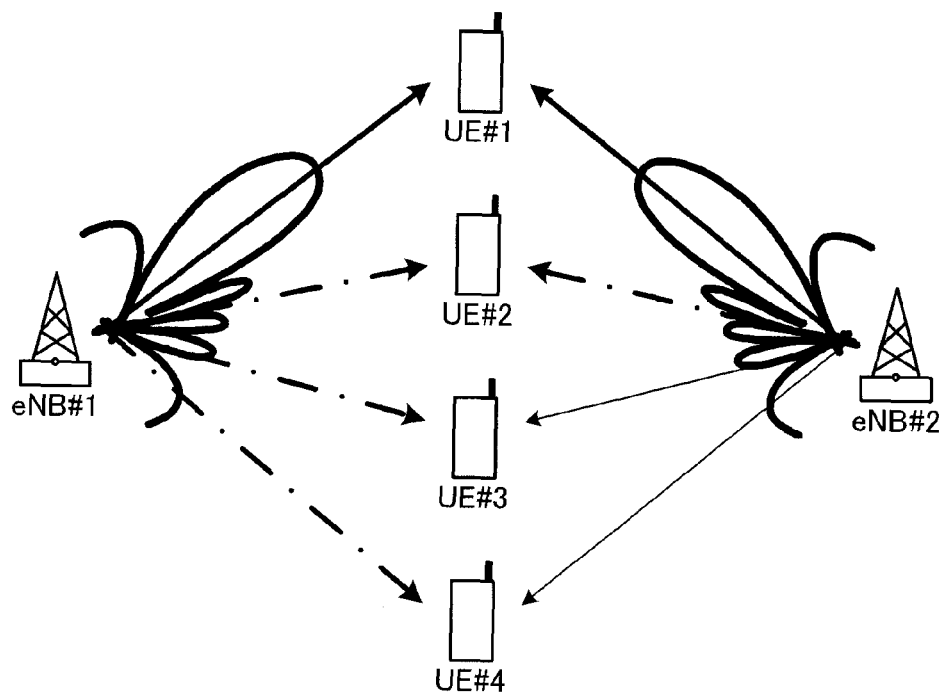
FIG. 4 is a diagram to explain states of transmission beams in transmitting data to a mobile station apparatus UE#1 using precoding weights generated in a precoding weight generation method according to a second aspect of the invention.

FIG. 4 is a diagram to explain states of transmission beams in transmitting data to the mobile station apparatus UE#1 using precoding weights generated in the precoding weight generation method according to the second aspect. In FIG. 4, as in FIG. 2, states of transmission beams for the mobile station apparatuses UEs from the base station apparatus eNB are shown by arrows of bold solid lines, thin solid lines, and alternate long and short dashed lines. The bold solid lines represent transmission beams having the directivity, the thin solid lines represent transmission beams without null being directed, and the alternate long and short dashed lines represent null-directed transmission beams.

As shown in FIG. 4, the base station apparatus eNB#1 forms a transmission beam having the directivity for the mobile station apparatus UE#1 that is a target for data transmission. Further, the apparatus eNB#1 forms null-directed transmission beams for the mobile station apparatuses UE#2 to UE#4, and interference among other mobile station apparatuses UEs is suppressed.

Meanwhile, the base station apparatus eNB#2 forms a transmission beam having the directivity for the mobile station apparatus UE#1 that is a target for data transmission. Further, a null-directed transmission beam is formed for the mobile station apparatus UE#2, and interference is suppressed. Meanwhile, the transmission beams without null being directed are formed for the mobile station apparatuses UE#3 and UE#4, and interference is not suppressed.

Figure 5:
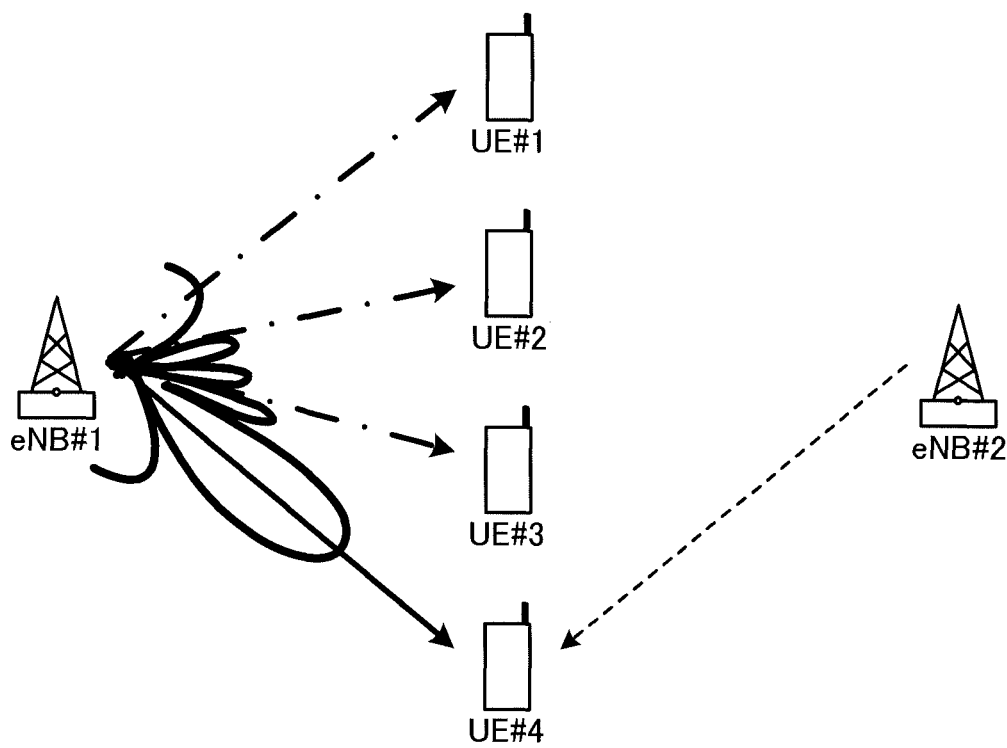
FIG. 5 is a diagram to explain states of transmission beams in transmitting data to a mobile station apparatus UE#4 using precoding weights generated in the precoding weight generation method according to the second aspect of the invention.

FIG. 5 is a diagram to explain states of transmission beams in transmitting data to the mobile station apparatus UE#4 using precoding weights generated in the precoding weight generation method according to the second aspect. As shown in FIG. 5, the base station apparatus eNB#1 forms a transmission beam having the directivity for the mobile station apparatus UE#4 that is a target for data transmission. Further, the apparatus eNB#1 forms null-directed transmission beams for the mobile station apparatuses UE#1 to UE#3, and interference among other mobile station apparatuses UEs is suppressed. Meanwhile, the base station apparatus eNB#2 does not transmit any data to the mobile station apparatus UE#4 that is the target for data transmission (shown by the dotted arrow in FIG. 5).

Thus, in the precoding weight generation method according to the second aspect, a channel matrix H is generated which includes the CSI of all mobile station apparatuses UE#1 to UE#4 undergoing spatial multiplexing in all cells, while having a zero element in a matrix element associated with the CSI between a mobile station apparatus UE that does not perform feedback and the base station apparatus eNB, and based on the channel matrix H, precoding weights from all base station apparatuses eNBs to all mobile station apparatuses UEs are collectively generated. By this means, it is possible to generate precoding weights including the mobile station apparatus UE that does not transmit the CSI as feedback, it is possible to effectively suppress interference on mobile station apparatuses UEs that transmit the CSI as feedback, and therefore, it is possible to minimize interference among mobile station apparatuses UEs even when the CSI is not transmitted from all mobile station apparatuses UEs as feedback in an environment where Joint Transmission is performed for a plurality of mobile station apparatuses UEs.

Particularly, in the precoding weight generation method according to the second aspect, since a plurality of base station apparatuses eNBs is capable of forming transmission beams enabling interference to be suppressed for a mobile station apparatus UE that transmits the CSI as feedback to a plurality of coordinated cells (base station apparatuses eNBs), it is possible to more suppress interference among mobile station apparatuses UEs for a mobile station apparatus UE having the higher number of coordinated cells.

An Embodiment of the invention will specifically be described below with reference to accompanying drawings.

Described herein is the case of using the base station apparatuses and mobile station apparatuses that support the LTE-A system.

Figure 6:
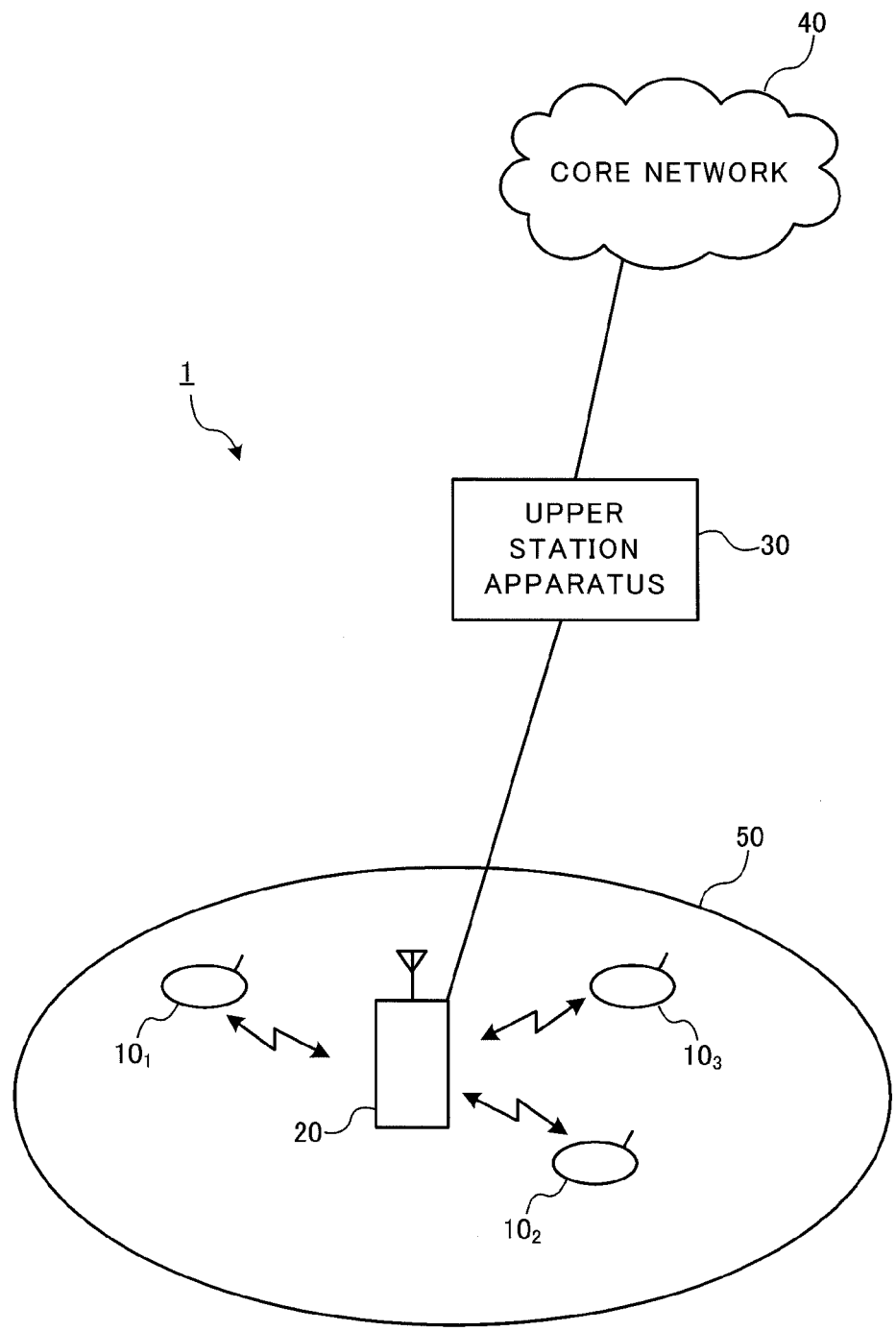
FIG. 6 is a diagram to explain a configuration of a mobile communication system having mobile station apparatuses and a base station apparatus according to one Embodiment of the invention.

Referring to FIG. 6, described is a mobile communication system 1 having mobile station apparatuses (UEs) 10 and base station apparatus (eNBs) 20 according to one Embodiment of the invention. FIG. 6 is a diagram to explain a configuration of the mobile communication system 1 having mobile station apparatuses 10 and base station apparatus 20 according to the Embodiment of the invention. In addition, for example, the mobile communication system 1 as shown in FIG. 6 is a system including the LTE system or Super 3G. Further, the mobile communication system 1 may be called IMT-Advanced or may be called 4G.

As shown in FIG. 6, the mobile communication system 1 includes a base station apparatus 20 and a plurality of mobile station apparatuses 10 ($10_1$, $10_2$, $10_3$, ... $10n$, n is an integer where n>0) that communicate with the base station apparatus 20, and is comprised thereof. The base station apparatus 20 is connected to a higher station apparatus 30, and the higher station apparatus 30 is connected to a core network 40. The mobile station apparatuses 10 communicate with the base station apparatus 20 in a cell 50. In addition, for example, the higher station apparatus 30 includes an access gateway apparatus, Radio Network Controller (RNC), Mobility Management Entity (MME) and the like, but is not limited thereto.

Each of the mobile station apparatuses ($10_1$, $10_2$, $10_3$, ... $10_n$) has the same configuration, function and state, and is described as a mobile station apparatus 10 unless otherwise specified in the following description. Further, for convenience in description, the description is given while assuming that equipment which performs radio communication with the base station apparatus 20 is the mobile station apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. In downlink, used are the PDSCH shared among the mobile station apparatuses 10, and downlink L1/L2 control channels (PDCCH, PCFICH, PHICH). User data i.e. normal data signals are transmitted on the PDSCH. The transmission data is included in the user data. In addition, a CC assigned to a mobile station apparatus 10 in the base station apparatus 20 and scheduling information is notified to the mobile station apparatus 10 on the L1/L2 control channel.

In uplink, used are the PUSCH (Physical Uplink Shared Channel) shared among the mobile station apparatuses 10, and the PUCCH (Physical Uplink Control Channel) that is a control channel in uplink. User data is transmitted on the PUSCH. Meanwhile, the CSI, radio quality information (CQI: Channel Quality Indicator) in downlink and the like are transmitted on the PUCCH.

The precoding weight generation method according to the invention is mainly related to processing in the base station apparatus 20 that such a mobile communication system 1 has. The mobile station apparatus 10 is of the configuration having normal functions for measuring the channel state information of the transmission path channel between the base station apparatus 20 and the apparatus 10, and transmitting a measurement result as the CSI as feedback, and detailed descriptions thereof are omitted.

Figure 7:
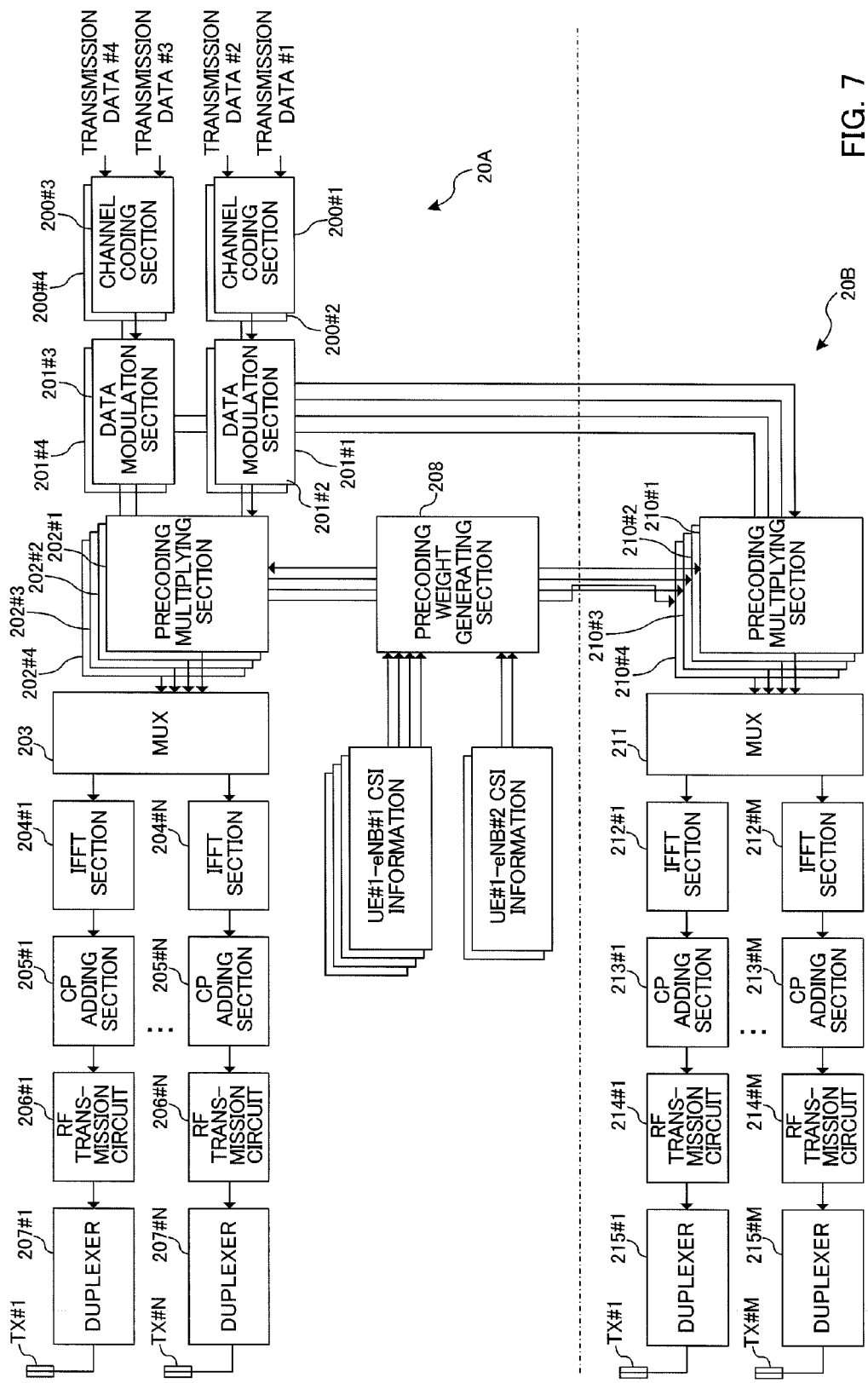
FIG. 7 is a block diagram illustrating a configuration of transmission sections of the base station apparatus according to the Embodiment.

FIG. 7 is a block diagram illustrating a configuration of transmission sections of the base station apparatus 20 according to the Embodiment. In addition, for convenience in description, FIG. 7 shows transmission sections of two coordinated base station apparatuses 20 (20A, 20B). Further, in FIG. 7, the base station apparatus 20A described in the upper portion constitutes a control base station apparatus that generates precoding weights, and the base station apparatus 20B described in the lower portion constitutes a base station apparatus (controlled base station apparatus) that receives precoding weights from the control base station apparatus.

Further, in FIG. 7, the base station apparatus 20A is associated with the base station apparatus eNB#1 as shown in FIG. 1, and the base station apparatus 20B is associated with the base station apparatus eNB#2 as shown in FIG. 1. In other words, the base station apparatus 20A receives the CSI from the mobile station apparatuses UE#1 to UE#4, and the base station apparatus 20B receives the CSI only from the mobile station apparatuses UE#1 and UE#2. As described above, the base station apparatus 20A constitutes the control base station apparatus, and collects the CSI (CSI from the mobile station apparatuses UE#1 and UE#2) received in the base station apparatus 20B. In the following description, for convenience in description, it is assumed that the wording of the mobile station apparatuses UE#1 to UE#4 is used in accordance with FIG. 1.

Transmission data #1 to #4 to the mobile station apparatuses UE#1 to UE#4 that the apparatus 20A is instructed to transmit from the higher station apparatus 30, not shown, is output to channel coding sections 200#1 to 200#4. After undergoing channel coding in channel coding sections 200#1 to 200#4, the transmission data #1 to #4 is output to data modulation sections 201#1 to 201#4, and undergo subcarrier modulation. The transmission data #1 to #4 subjected to subcarrier modulation in the data modulation sections 201#1 to 201#4 is output to precoding multiplying sections 202#1 to 202#4, and precoding multiplying sections 210#1 to 210#4.

Based on precoding weights provided from a precoding weight generating section 208, described later, the precoding multiplying sections 202#1 to 202#4 shift phases and/or amplitude of the transmission data #1 to #4 for each of transmission antennas TX#1 to TX#N (weighting of the transmission antennas TX#1 to TX#N by precoding). The transmission data #1 to #4 with the phase and/or amplitude shifted in the precoding multiplying sections 202#1 to 202#k is output to a multiplexer (MUX) 203.

The multiplexer (MUX) 203 combines the transmission data #1 to #4 with the phase and/or amplitude shifted, and generates transmission signals for each of the transmission antennas TX#1 to TX#N. Then, the transmission signals generated in the multiplexer (MUX) 203 undergo inverse fast Fourier transform in inverse fast Fourier transform sections (IFFT) 204#1 to 204#N, and the signals in the frequency domain are transformed into the signals in the time domain. Then, the signals are provided with CPs in Cyclic Prefix (CP) adding sections 205#1 to 205#N, and output to RF transmission circuits 206#1 to 206#N. Then, the signals are subjected to frequency conversion processing for converting into the radio frequency band in the RF transmission circuits 206#1 to 206#N, then output to the transmission antennas TX#1 to TX#N via duplexers 207#1 to 207#N, and transmitted from the transmission antennas TX#1 to TX#N to the mobile station apparatuses UE#1 to UE#4 in downlink.

Meanwhile, based on precoding weights provided from the precoding weight generating section 208, described later, the precoding multiplying sections 210#1 to 210#4 shift phases and/or amplitude of the transmission data #1 to #4 for each of transmission antennas TX#1 to TX#M (weighting of the transmission antennas TX#1 to TX#M by precoding). The transmission data #1 to #4 with the phase and/or amplitude shifted in the precoding multiplying sections 210#1 to 210#4 is output to a multiplexer (MUX) 211.

The multiplexer (MUX) 211 combines the transmission data #1 to #4 with the phase and/or amplitude shifted, and generates transmission signals for each of the transmission antennas TX#1 to TX#M. Then, the transmission signals generated in the multiplexer (MUX) 211 undergo inverse fast Fourier transform in inverse fast Fourier transform sections (IFFT) 212#1 to 212#M, and the signals in the frequency domain are transformed into the signals in the time domain. Then, the signals are provided with CPs in Cyclic Prefix (CP) adding sections 213#1 to 213#M, and output to RF transmission circuits 214#1 to 214#M. Then, the signals are subjected to the frequency conversion processing for converting into the radio frequency band in the RF transmission circuits 214#1 to 214#M, then output to the transmission antennas TX#1 to TX#M via duplexers 215#1 to 215#M, and transmitted from the transmission antennas TX#1 to TX#M to the mobile station apparatuses UE#1 to UE#4 in downlink.

The precoding weight generating section 208 receives the CSI ("UE#1-eNB#1 CSI", etc. as shown in FIG. 7) between the mobile station apparatuses UE#1 to UE#4 and the base station apparatus 20A (eNB#1) measured in the apparatuses UE#1 to UE#4, and the CSI ("UE#1-eNB#2 CSI", etc. as shown in FIG. 7) between the mobile station apparatuses UE#1 and UE#2 and the base station apparatus 20B (eNB#2) measured in the apparatuses UE#1 and UE#2. The precoding weight generating section 208 generates the channel matrix $H_k$ or channel matrix H having these pieces of CSI in matrix elements, according to the precoding weight generation method according to the first or second aspect as described above, and based on the channel matrix $H_k$ or channel matrix H, generates precoding weights for the mobile station apparatuses UE#1 to UE#4. In other words, the precoding weight generating section 208 constitutes the matrix generating section and the weight generating section in the claims.

For example, in the case of complying with the precoding weight generation method according to the first aspect, a channel matrix $H_k$ comprised of the CSI of a plurality of mobile station apparatuses UEs to perform spatial multiplexing is generated for each coordinated cell, and based on the channel matrix $H_K$, precoding weights are generated successively starting from the cell with the highest number of mobile station apparatuses UEs that transmit the CSI as feedback. In this case, the precoding weights are generated so as to preferentially suppress interference on mobile station apparatuses UEs that do not transmit the CSI as feedback except the weight generation target cell, while not suppressing interference on the other mobile station apparatuses UEs. By this means, it is possible to preferentially suppress interference on the mobile station apparatus UE such that suppression of interference is not expected in a cell except the weight generation target cell, it is possible to effectively improve system characteristics in the mobile station apparatus UE with the low number of cells to transmit the CSI as feedback, and it is possible to minimize interference among mobile station apparatuses UEs even when the CSI is not transmitted from all mobile station apparatuses UEs as feedback in an environment where Joint Transmission is performed for a plurality of mobile station apparatuses UEs.

Particularly, in the case of complying with the precoding weight generation method according to the first aspect, it is possible to efficiently use in interference suppression in consideration of versatility of antennas in the base station apparatus eNB, and it is thereby possible to suppress interference among mobile station apparatuses UEs irrespective of the number of coordinated cells.

Further, in the case of complying with the precoding weight generation method according to the second aspect, a channel matrix H is generated which includes the CSI of all mobile station apparatuses UE#1 to UE#4 undergoing spatial multiplexing in all cells, while having a zero element in a matrix element associated with the CSI between a mobile station apparatus UE that does not perform feedback and the base station apparatus eNB, and based on the channel matrix H, precoding weights from all base station apparatuses eNBs to all mobile station apparatuses UEs are collectively generated. By this means, it is possible to generate precoding weights including the mobile station apparatus UE that does not transmit the CSI as feedback, it is possible to effectively suppress interference on mobile station apparatuses UEs that transmit the CSI as feedback, and therefore, it is possible to minimize interference among mobile station apparatuses UEs even when the CSI is not transmitted from all mobile station apparatuses UEs as feedback in an environment where Joint Transmission is performed for a plurality of mobile station apparatuses UEs.

Particularly, in the case of complying with the precoding weight generation method according to the second aspect, since a plurality of base station apparatuses eNBs is capable of forming transmission beams enabling interference to be suppressed for a mobile station apparatus UE that transmits the CSI as feedback to a plurality of cells (base station apparatuses eNBs), it is possible to more suppress interference among mobile station apparatuses UEs for a mobile station apparatus UE having the higher number of coordinated cells.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2010-038248 filed on Feb. 24, 2010, entire content of which is expressly incorporated by reference herein.

The invention claimed is:

1. A precoding weight generation method used for a plurality of base station apparatuses in coordinating and transmitting data to a plurality of mobile station apparatuses by Joint Transmission, comprising:
    generating a channel matrix having, in matrix elements, channel state information transmitted as feedback from the plurality of mobile station apparatuses undergoing spatial multiplexing for each cell that each of the base station apparatuses manages; and
    generating precoding weights based on the channel matrix successively starting from a cell having the highest number of mobile station apparatuses that transmit the channel state information as feedback, wherein when data transmission is targeted for a first mobile station apparatus that transmits the channel state information as feedback to the plurality of base stations as well as transmits the channel state information to a weight generation target cell that is a target for generation of the precoding weights, the precoding weights are generated so as not to suppress interference on a second mobile station apparatus that transmits the channel state information as feedback to the plurality of base stations as well as transmits the channel state information to the weight generation target cell, while suppressing interference on a third mobile station apparatus that does not transmit the channel state information as feedback except to the weight generation target cell.

2. The precoding weight generation method according to claim 1, wherein the precoding weights are generated using the channel matrix from which a matrix element associated with the second mobile station is deleted.

3. The precoding weight generation method according to claim 1, in a cell in which precoding weights are generated subsequently, the precoding weights are generated to reduce an effect of interference due to a precoding weight for the second mobile station apparatus that is previously generated.

4. The precoding weight generation method according to claim 1, used for the plurality of base station apparatuses in coordinating and transmitting data to the plurality of mobile station apparatuses by Joint Transmission, further comprising:
generating the channel matrix including, in matrix elements, channel state information transmitted as feedback from the plurality of mobile station apparatuses undergoing spatial multiplexing in a cell managed by each base station apparatus and each cell, while having a zero element in a matrix element associated with channel state information between a mobile station apparatus that does not perform feedback to a corresponding base station apparatus; and
collectively generating precoding weights for all mobile station apparatuses based on the channel matrix.

5. A control apparatus that generates precoding weights used for a plurality of base station apparatuses in coordinating and transmitting data to a plurality of mobile station apparatuses by Joint Transmission, comprising:
a precoding weight generating section comprising:
a matrix generating section generating a channel matrix having, in matrix elements, channel state information transmitted as feedback from the plurality of mobile station apparatuses undergoing spatial multiplexing for each cell that each of the base station apparatuses manages; and
a weight generating section generating precoding weights based on the channel matrix successively starting from a cell having the highest number of mobile station apparatuses that transmit the channel state information as feedback;
wherein when data transmission is targeted for a first mobile station apparatus that transmits the channel state information as feedback to the plurality of base stations as well as transmits the channel state information to a weight generation target cell that is a target for generation of the precoding weights, the precoding weight generating section generates the precoding weights so as not to suppress interference on a second mobile station apparatus that transmits the channel state information as feedback to the plurality of base stations as well as transmits the channel state information to the weight generation target cell, while suppressing interference on a third mobile station apparatus that does not transmit the channel state information as feedback except to the weight generation target cell.

6. The precoding weight generation method according to claim 2, in a cell in which precoding weights are generated subsequently, the precoding weights are generated to reduce an effect of interference due to a precoding weight for the second mobile station apparatus that is previously generated.

* * * * *